March 9, 1965

R. W. SINGER 3,172,788

METHOD OF MAKING AND HEAT TREATING FOOD WASTE
DISPOSER SHREDDING RINGS

Filed Aug. 26, 1963

INVENTOR.
Roy. W. Singer
BY
Andrew B. Hubbard
Atty.

March 9, 1965 R. W. SINGER 3,172,788
METHOD OF MAKING AND HEAT TREATING FOOD WASTE
DISPOSER SHREDDING RINGS
Filed Aug. 26, 1963 2 Sheets-Sheet 2
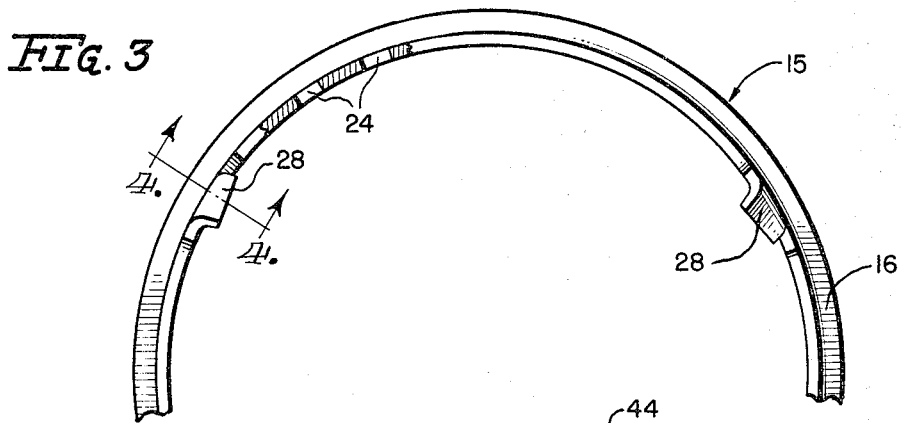
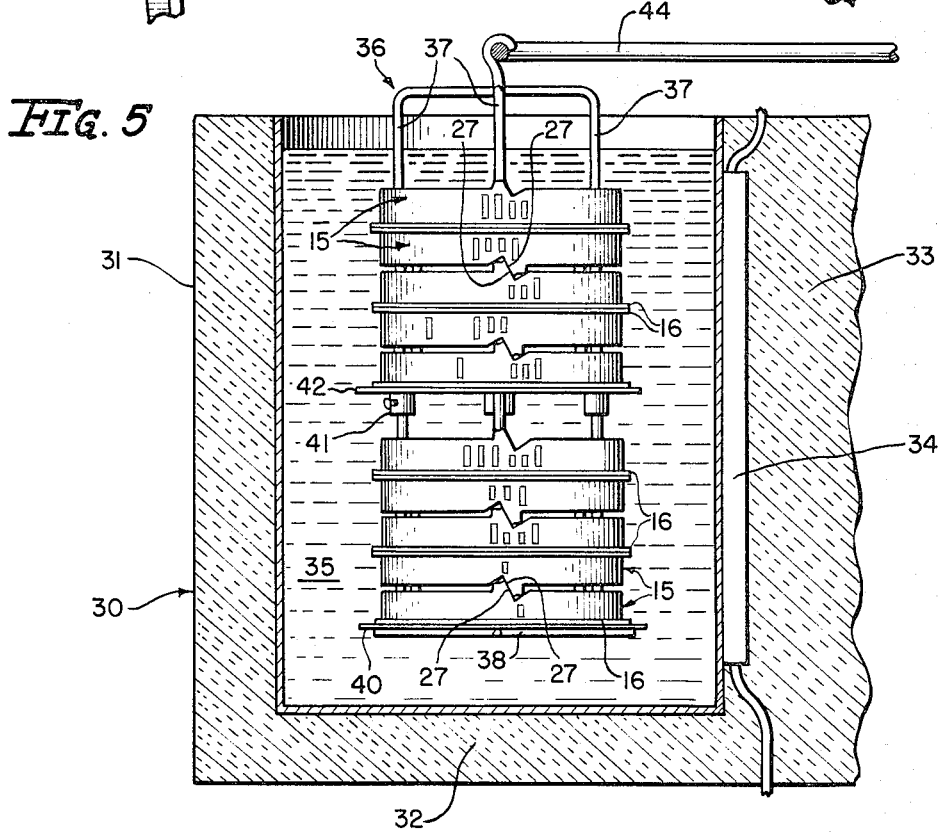
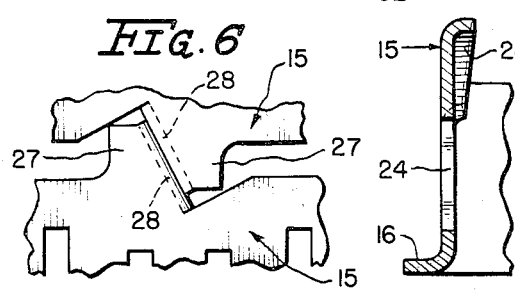
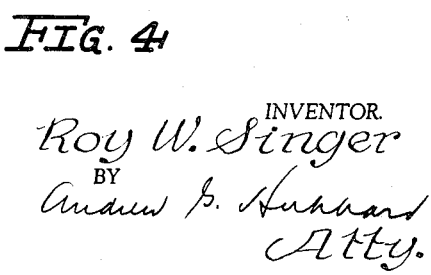
INVENTOR.
Roy W. Singer
BY
Andrew B. Hubbard
Atty.

United States Patent Office 3,172,788
Patented Mar. 9, 1965

3,172,788
METHOD OF MAKING AND HEAT TREATING FOOD WASTE DISPOSER SHREDDING RINGS
Roy W. Singer, Wauwatosa, Wis., assignor to General Electric Company, a corporation of New York
Filed Aug. 26, 1963, Ser. No. 304,360
3 Claims. (Cl. 148—15.5)

This invention relates to food waste disposers and in particular to an improved method of manfacturing shredding rings therefor.

Competitive emphasis on food waste disposers which can be mass produced inexpensively and sold to the consumer at low cost is difficult to reconcile with the increasing insistence by plumbing authorities that food waste disposers quickly and efficiently reduce the food waste to very small particle size. It is well known that domestic food waste grinding operations are accompanied by flow of cold water from the kitchen sink into the hopper of the disposer, whereupon the issue from the disposer comprises a slurry of waste and water. Manufacturers therefore have the problem of providing a low cost food waste disposer which will grind quickly so as to reduce the time during which the cold water must be flowing, and grind fine so that the waste particles will flow freely through the plumbing waste lines. In view of the fact that the shredding ring against which the food waste is impelled by a rotating disk at the base of the hopper comprises a most important part of the apparatus, it is necessary that the shredding ring be accurately concentric to the rotating disk, provide small running clearance relative thereto, maintain its hardness, and resist wear for a long period of life in order that the disposer will retain its capacity for quickly reducing the food waste to small particle size.

The present invention provides a shredding ring structure which is easily and inexpensively fabricated, and is particularly adaptable to the carburizing process necessary to give the required hardness to the metal and the cutting edges thereof.

It is therefore an object of the invention to provide a method of manufacturing food waste disposer shredding rings, and in particular to provide a method of case hardening the same which will produce the required hardness with minimum distortion of the completed shredding ring so that the roundness and concentricity thereof with respect to the rotating disk will be maintained within very close tolerances.

Other features and advantages of the invention will best be understood from the following detailed description of a presently preferred method of manufacture read in connection with the accompanying drawings in which:

FIG. 3 is a plan view of a portion of the shredding ring taken on a diameter thereof;

FIG. 4 is a sectional elevation of the shredding ring taken on lines 4—4 of FIG. 3;

FIG. 5 is a somewhat schematic elevational section of a carburizing apparatus showing the suspension of a stack of shredding rings in the molten carburizing salt; and FIG. 6 is an enlarged detail showing the interfitting relation of portions of two rings in the stack.

Figure 1:
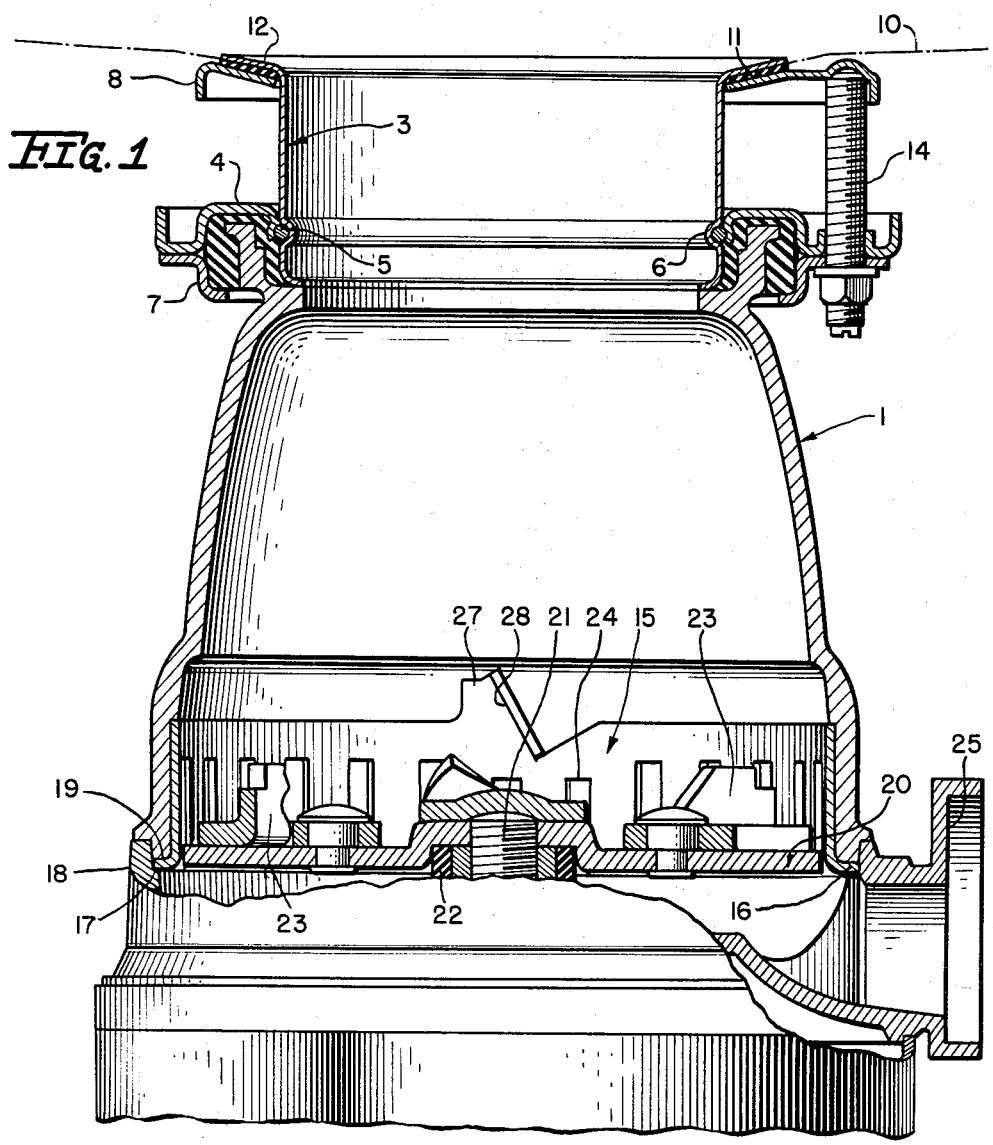
FIG. 1 is a side elevation partly in section of a food waste disposer having a shredding ring manufactured according to the present invention.

Referring now to FIG. 1, a food waste disposer 1 includes a hopper 2 within which food waste (not shown) is deposited for comminution. Entrance to the hopper is by way of the cylindrical fitting 3 to which the hopper is attached by the support ring 4, carried by a snap ring 5, seated in the groove 6, rolled into the fitting 3; the mounting of the hopper is completed by the compression ring 7 and the clamping ring 8 which confines the sink bottom 10 (indicated in broken line) against the gasket 11 interposed between the sink and the flange 12 of the fitting 3. The actual compression effect is exerted by bolts 14, of which there are usually three. This construction is now conventional and well understood in the food waste disposer art. The hopper 2 is configurated to retain the shredding ring 15 which, according to the present invention, is formed from a hot-rolled carbon steel blank and case-carburized after the blank is formed into the shredding ring, as later explained. The shredding ring is very accurately sized to fit snugly within the hopper; the securement of the ring within the hopper is perfected by the flange portion 16 which seats on a step 17 in the drain housing 18, and is confined thereon by the lower edge 19 of the hopper. It will be understood that machine screws (not shown) secure the drain housing to the hopper.

The base of the hopper 2 comprises a relatively heavy circular disk or plate 20 mounted on the threaded end of the motor shaft 21, as well known in the art. Appropriate bearings and seals 22 are provided. The plate 20 has impellers or "mauls" 23 pivotally mounted thereon for rotation in a horizontal plane. During the rapid rotation of the plate 20, the mauls 23 urge the food waste against the shredding ring 15; this takes place in the presence of water flowing into the hopper from the kitchen sink. The resulting slurry or waste particles and water flows into the drain housing 18 through the wall openings 24 of the shredding ring 15. Said openings are disposed about the full circumference of the ring. The outlet 25 of the housing is adapted for connection to a conventional plumbing waste trap (not shown).

In view of the requirement that the plate 20 have a very close running fit within the shredding ring, both the plate and the shredding ring are manufactured to close tolerances. The plate 20, being relatively heavy and simple in design, presents no great problems, but the ring 15 is of lighter material, cylindrical, and with many open spaces. It is therefore susceptible to warpage or distortion during the hardening process to which it is subjected, and it is of the utmost importance that this warpage be held at an absolute minimum. As an example of the rigid requirements in the manufacture of the shredding rings, the production standards of applicant's assignee herein call for the shredding ring 15 to have an outside diameter of 5.594 inches plus or minus .003 of an inch; the ring must be concentric within .015 TIR (total indicator reading) and round within .010 TIR on the outside diameter. The shredding ring is case-carburized and hardened to a Rockwell (C) hardness of 60–63; the depth of the case must be not less than 0.020 inch.

Figure 2:
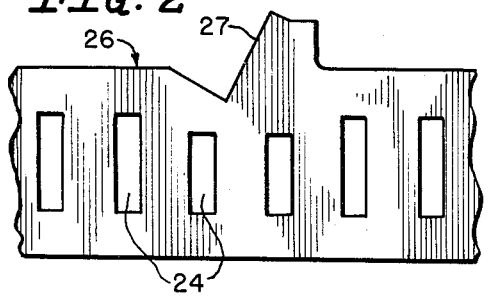
FIG. 2 is a fragmentary plan view of the flat blank from which the shredding ring is formed.

The shredding ring 15 is formed from a blank of hot rolled carbon steel shown fragmentarily in FIG. 2; the stamped blank 26 is characterized by the rectangular apertures 24 and the peaks 27, there being three such peaks which eventually provide primary cutting edges 28, best shown in FIGS. 3 and 4. These cutting edges are formed by bending the sloping edge of the peak. The blank 26 is thereupon formed into a cylinder and the butting ends welded. The flange 16 is formed in a two-stage operation in which the first stage bends the flange portion outwardly at about 45 degrees and the second stage completes the flange so that it is at precisely 90 degrees with respect to the cylindrical axis of the ring. The outside diameter and the concentricity of the ring are brought to the dimensions and tolerances previously noted. Conventional metal working machines (not shown) are used for the foregoing operations. The shredding rings are then ready for case hardening and heat-treating. It is necessary to hold at an absolute minimum, any distortion of the rings during the case hardening process, and yet to effect economies of mass production it is necessary to harden and heat treat a relatively large number of shredding rings at one time.

I have found that by mounting the shredding rings on suitable carries on which ten shredding rings may be mounted in vertical stacks of five rings each, I can utilize the buoyant effect of a molten carburizing salt to effectively reduce the gravitational effect of each ring on its next lower ring in the stack and, of course, reduce the gravitational effect of the pile of rings on the lowermost ring of the stack. Also, I arrange the rings on each carrier in a manner in which there is little physical contact of each ring with its adjacent ring, especially in the areas of the ring against which the food waste is impelled. As will later be apparent, there is only point and line contact of one ring with the next at the peaks from which the primary cutting teeth are formed; the greatest area of contact of one ring with the next is at the base flange which, as is apparent from FIG. 1, does not play any part in the reduction of the food waste.

A typical carburizing bath comprises:

| | Percent |
|---|---|
| Sodium cyanide _____(by weight)__ | 17–23 |
| Barium chloride _____ | 15–40 |
| Other alkaline earths _____ | 0–3.5 |
| Sodium chloride _____ | 20–30 |
| Sodium carbonate _____max__ | 30 |
| Sodium cyanate _____max__ | 1 |

Roughly, the density of such a bath in its molten state at about 1,650 degrees F. is of the order of 2 grams per cc. The density of the steel shredding rings is only about four times that, whereupon it is apparent that the buoyant effect of the molten salt substantially "reduces" the weight to which the lowermost ring in the stack is subjected.

Looking now at FIG. 5, I show in fragmentary elevational section and in schematic fashion, a carburizing apparatus 30 comprising a cylindrical outer wall 31, a base 32, and a cylindrical central portion 33, within which is shown an electric resistance heater 34 intended merely to typify any conventional heating method. In practice, such heating methods may include resistance or induction heating, gas or oil firing, or the like. The construction provides an annular space 35 which accommodates the carburizing salt and a plurality of supporting racks by means of which the shredding rings are introduced into and removed from the molten bath. A typical rack 36 may comprise a cage having three upright wires 37, collectively providing an open core over which the shredding rings 15 freely fit. Radially extending wires 38 support an annular base plate 40, and at an appropriate level a U-shaped block 41 straddles each of the wires 37 to provide for the support of an intermediate base plate 42. The respective base plates divide the support frame 36 to accommodate ten shredding rings in two 5-ring stacks. The shredding rings are stacked so that each is in inverted relation to its immediately adjacent ring. By this arrangement of stacking there is minimum metal-to-metal contact of adjacent rings in any area in which hardness is a critical factor. As shown in FIG. 5, the rings carried by the respective plates 40 and 42 are upright; that is, the flange 16 rests on the plate. The next uppermost ring is in an inverted posture in which the peak portions 27 of each are in an interdigited relationship, in which there is actually only line and point contact between the rings, as indicated in the large representation shown in FIG. 6. The uppermost edges of the rings are in spaced relationship. In view of the fact that there are only three such peaks in each shredding ring, it is apparent that there are no critical areas in which one ring may shield another from the carburizing treatment. The plates 40 and 42 are horizontally disposed and the shredding rings are therefore maintained in this disposition also. Considering the lower stack of rings as viewed in FIG. 5, the third ring from the bottom is up-right, whereupon the flange 16 of the second ring provides the support for the flange 16 of said third ring. This flange-to-flange support represents the maximum contact which one ring will have with another during the carburizing or heat treatment, and in view of the fact that these flange portions are not critical areas of the shredding rings, it is unimportant that the substantial metal-to-metal contact of these adjacent rings may interfere with or limit the carburizing of the rings in these areas. It is important, however, that the flange of the second ring provide a stable base for the third ring, and that the flange of the fourth ring provide a stable base for the fifth or uppermost ring in the stack. I attribute the freedom from distortion resulting from this carburizing method to the buoyant effect which the molten salt has on the respective rings, to the limited contact of one ring with the next in the carburizing bath, and the stability with which the rings are maintained with respect to each other while in the bath.

Each of the several support frames 36 is hooked over a carrier 44 having any suitable means (not shown) whereby the carrier and its associated support frame may be lowered or raised relative to the carburizing apparatus.

After the carburizing treatment, which comprises immersion of the stacks of shredding rings for two and one-half hours in the bath (which is held at 1,650 degrees F.) the support frames and thereon mounted rings are removed from the apparatus and quenched in 1,550 degree F. quenching oil. The carburizing and subsequent treatment produces a "case" of from 0.020 inch to 0.030 inch in depth and the desired 60–65 Rockwell (C) hardness.

The use of the platform support frames and the inversion of the succession of the shredding rings on the frames maintains the rings against tilting or other angular displacement while reducing to a minimum, the contact of critical areas of one ring with the next. Further, the use of a bath of molten carburizing material rather than the use of a gaseous or solid carburizing material provides for the mass treatment of shredding rings in such a manner that the cumulative weight of the plurality of rings is minimized as respects any distortion which such weight might otherwise cause. Pursuant to the present method, therefore, the shredding rings are within the required .015 inch TIR limit following the carburizing and heat treatment, and are available for installation in the hopper 2 without requiring corrective treatment.

While there has been described what is at present thought to be a preferred embodiment of the invention, it will be understood that various modifications may be made therein, and it is intended to cover in the appended claims all such modifications which fall within the true spirit and scope of the invention.

I claim:

1. In the manufacture of sheet steel cylindrical shredding rings for subseqeunt installation in food waste disposers wherein each said ring is a sheet steel part formed into a short cylinder with elongated cutting teeth formed along one end thereof and with an outwardly directed flange formed along the other end thereof, the method of case hardening said rings including the steps of arranging a plurality of said cylindrical rings in a stack with the flange of the lowermost ring providing a horizontally disposed support base for the stack, with the next uppermost ring being placed in an inverted posture so that it is supported on the first-named ring substantially only by contact of the respective peak portions of the said rings, and with the flange portion of the second ring providing a horizontally disposed support base for the flange portion of a third ring, and immersing said stack of rings in a liquid carburizing bath essentially comprising molten salt.

2. In the manufacture of sheet steel cylindrical shredding rings for subsequent installation in food waste disposers, the method of case hardening said rings comprising arranging a plurality of rings on a supporting structure in a manner providing a vertical stack of rings in which the top of each said ring provides a base for the horizontal support of the next uppermost ring and the respective rings are maintained against lateral or angular displacement, immersing said stack in a bath of molten carburizing salt whereby the buoyancy of the rings therein reduces the weight to which the lower rings of the stack would otherwise be subjected and thus reduce the possibility of weight-induced distortion thereof, and maintaining said rings in said bath for a period sufficient to produce a case having a thickness of the order of 0.020 to 0.030 inch.

3. The method of manufacturing sheet steel cylindrical shredding rings for subsequent use as comminution devices in food waste disposers, including the step of arranging a plurality of rings on a supporting structure in a manner providing a vertical stack of rings in which each said ring provides a horizontally disposed base for the next uppermost ring and the respective rings are in substantial physical contact only in areas which are not critical as respects the comminution of food waste, immersing said stack in a bath of molten carburizing salt whereby the buoyancy of the rings therein minimizes the distortion which the weight of the respective rings might otherwise exert on the lower rings of the stack, and maintaining said rings in said bath for a period sufficient to produce a case having a thickness of the order of 0.020 to 0.030 inch.

References Cited by the Examiner
UNITED STATES PATENTS

| | | | |
|---|---|---|---|
| 1,827,872 | 10/31 | Frost | 148—16.6 |
| 2,078,244 | 4/37 | High | 148—15.5 |
| 2,125,606 | 8/38 | Deeb | 148—16.6 |
| 2,520,334 | 8/50 | Peters | 148—16.5 |
| 2,846,344 | 8/58 | Waterfall et al. | 148—15.5 |
| 2,846,345 | 8/58 | Waterfall et al. | 148—15.5 |

DAVID L. RECK, *Primary Examiner.*